May 26, 1942.  C. A. NERACHER ET AL  2,284,224
POWER TRANSMISSION
Original Filed May 9, 1939  3 Sheets-Sheet 1
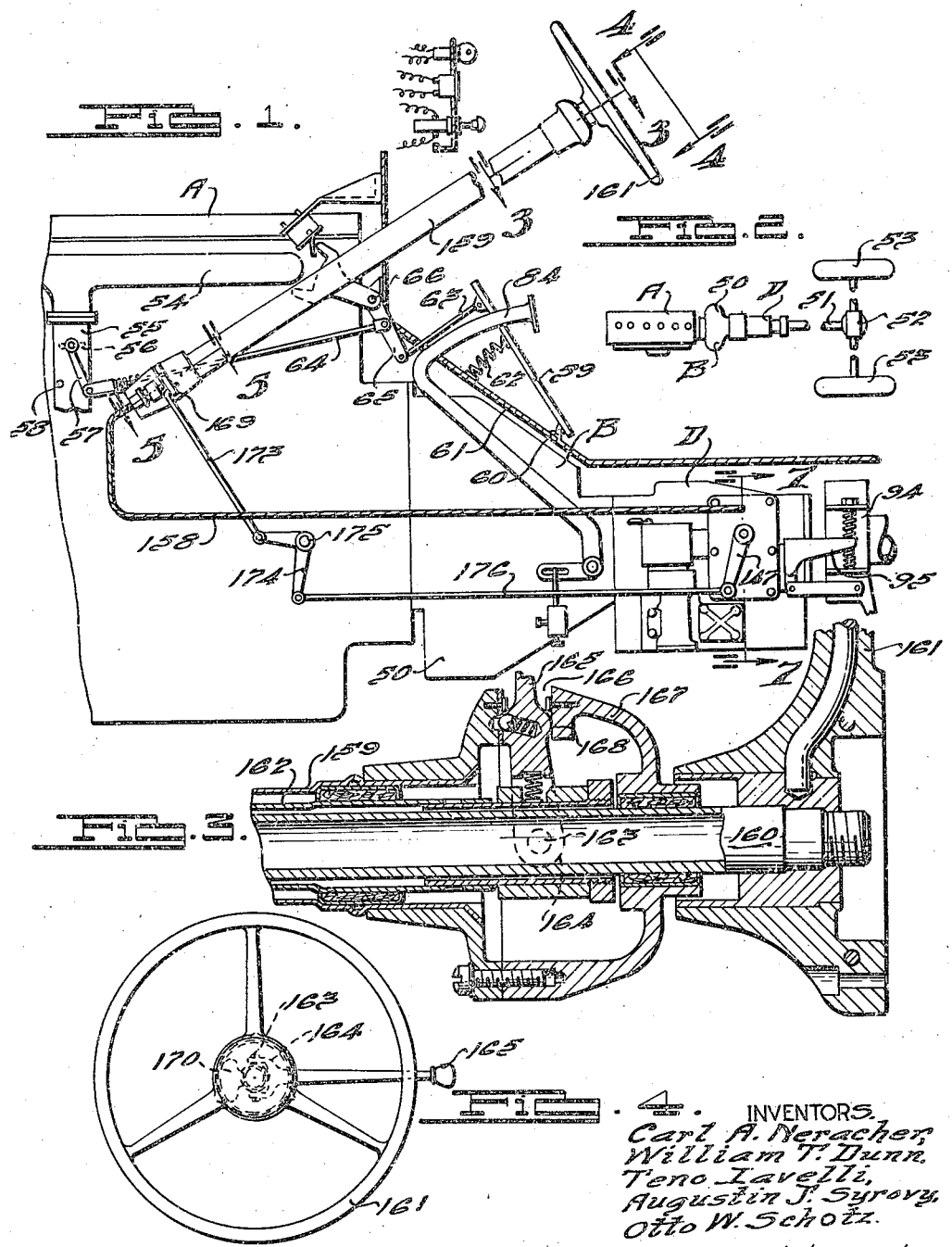
INVENTORS.
Carl A. Neracher,
William T. Dunn,
Teno Iavelli,
Augustin J. Syrovy,
Otto W. Schotz.
BY /Hamess, Lind, Patte & Harris
ATTORNEYS.

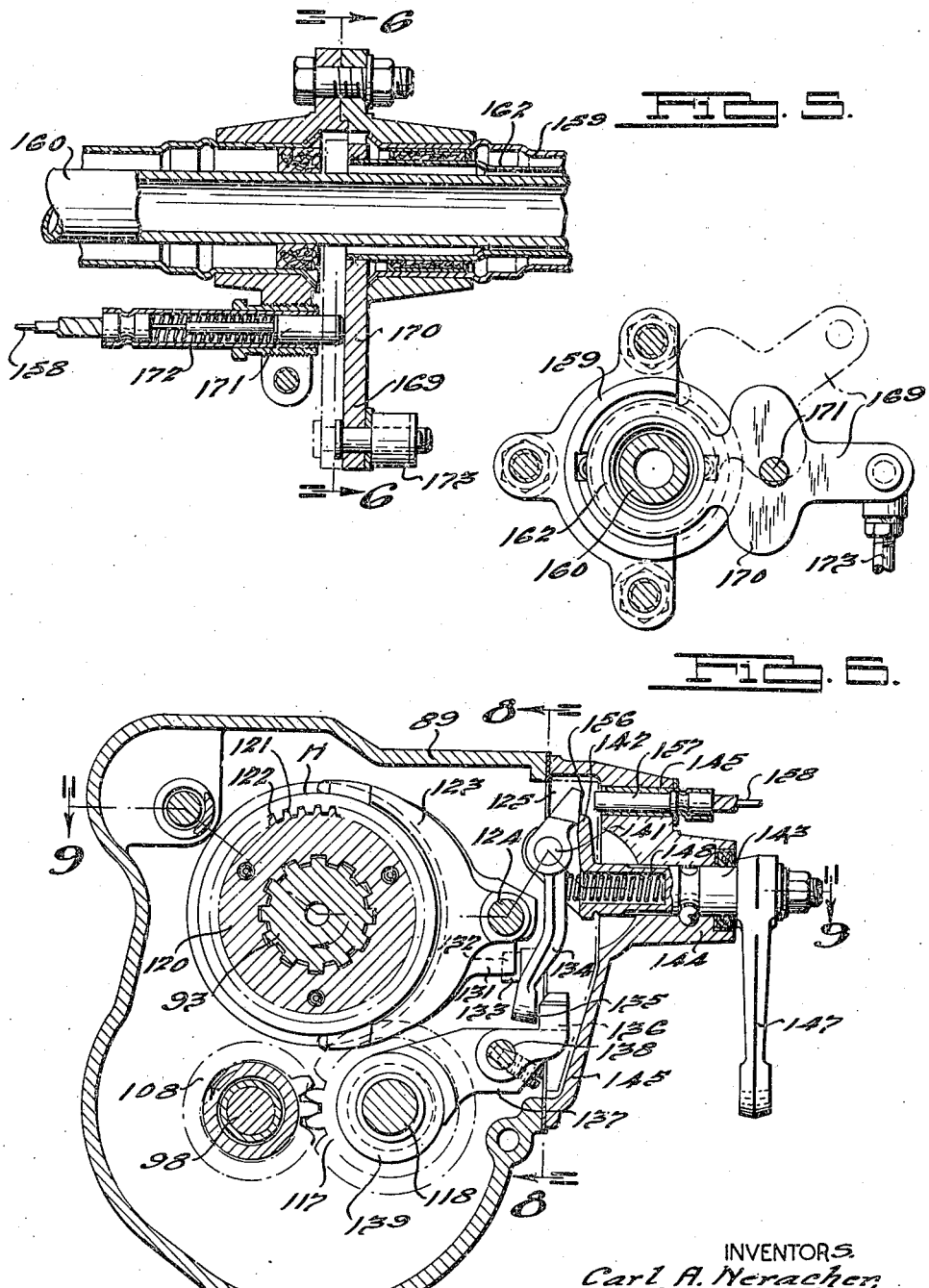

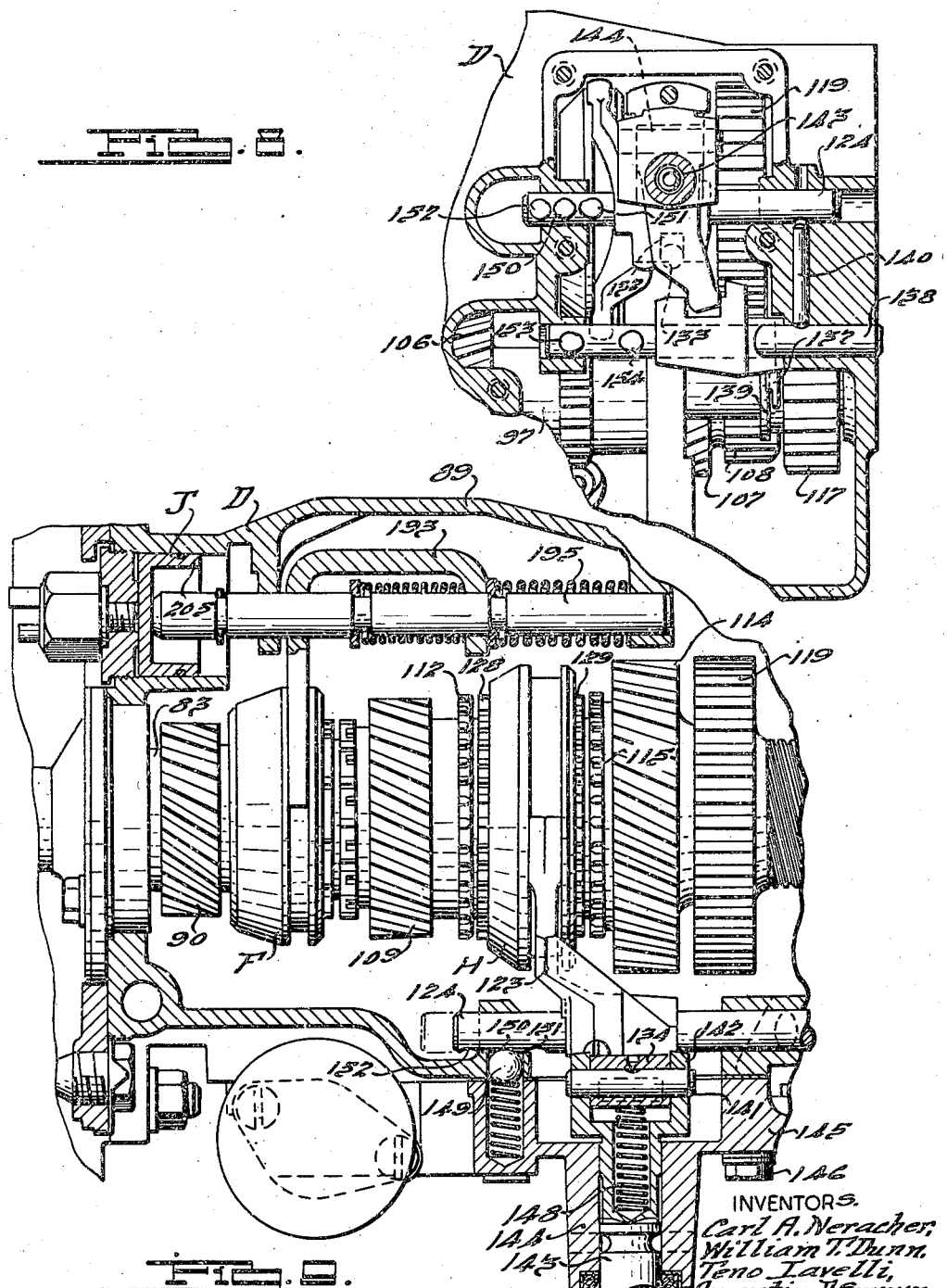

Patented May 26, 1942

2,284,224

UNITED STATES PATENT OFFICE 2,284,224

POWER TRANSMISSION

Carl A. Neracher, William T. Dunn, Teno Iavelli, Augustin J. Syrovy, and Otto W. Schotz, Detroit, Mich., assignors to Chrysler Corporation, Highland Park, Mich., a corporation of Delaware Original application May 9, 1939, Serial No. 272,734. Divided and this application April 29, 1940, Serial No. 332,190

3 Claims. (Cl. 74—473)

This application relates to power transmissions and is a division of our copending application, Serial No. 272,734, filed on May 9, 1939, entitled "Power transmission."

It is the principal object of the invention as claimed herein to provide an improved mechanism for manually shifting gears in a vehicle transmission which is simple in form, economical to manufacture and which permits smooth and easy operation.

More particularly, the principal advantage in our improved manually shiftable transmission control mechanism resides in the novel selector means located in the transmission casing which permits selection between the two transmission shifter rails in a positive manner and without undue expenditure of effort on the part of the vehicle driver.

In the embodiment of our invention as disclosed in the aforesaid copending application, we have provided a transmission employing countershaft gearing and providing four forward speeds and reverse. Manual selection may be made to high and low ranges in each of which an automatic shift occurs to a faster drive ratio and back to the selected range, the automatic shifting being effected by natural functional manipulations of the accelerator pedal.

Inasmuch as the details of the automatic shifting mechanism and the controls therefor have no particular bearing on the subject matter claimed herein, they will be referred to by reference numerals only when necessary to make the description clear. For a fuller explanation of the entire transmission, reference may be had to our copending application mentioned above.

The accompanying drawings illustrate a preferred embodiment of the invention wherein Fig. 1 is a side elevational view of the power plant and transmission for a motor vehicle.

Fig. 2 is a plan view somewhat diagrammatically illustrating the power transmission assembly in relation to the vehicle driving wheels.

Fig. 3 is a sectional view of the remote control hand shift mechanism taken as indicated by the line 3—3 of Fig. 1.

Fig. 4 is a top plan view of the Fig. 3 mechanism taken as indicated by line 4—4 of Fig. 1.

Fig. 5 is a sectional view along line 5—5 of Fig. 1 showing a portion of the remote control shift mechanism.

Fig. 6 is a detailed sectional view taken as indicated by the line 6—6 of Fig. 5.

Fig. 7 is a transverse sectional view looking rearwardly as indicated by the line 7—7 of Fig. 1 and illustrating the transmission portion of the remote shift mechanism.

Fig. 8 is a detailed sectional view taken as indicated by the line 8—8 of Fig. 7.

Fig. 9 is a sectional plan view taken as indicated by the line 9—9 of Fig. 7.

We have illustrated the principles of our invention in connection with a motor vehicle wherein the usual engine A transmits its drive through clutching means B positioned within casing 50, the drive then passing through the change speed mechanism D and propeller shaft 51 (Fig. 2) to the differential 52 and thence to the vehicle ground wheels 53 where it is desired to drive the rear wheels according to present day practice.

The engine A has the customary intake manifold 54 and carburetor riser 55 containing a throttle valve 56 operable by a lever 57 throughout a range between the illustrated closed throttle position for engine idling and a wide open position limited by lever 57 engaging a stop 58. Lever 57 is adjusted by a driver operable accelerator pedal 59 pivotally mounted at 60 on the toe-board 61 to swing downwardly against restoring spring 62 to thrust through the system of pivotally jointed links 63, 64 and connecting lever 65, the latter being pivotally supported at 66.

The engine A has the usual crankshaft which is adapted to drive the transmission input shaft 83 (Fig. 9) through a fluid coupling and a friction clutch (not shown) which are contained in the housing 50. Clutch pedal 84 is provided for manipulating the friction clutch and is adapted to disengage the clutch upon forward depression and to engage the clutch upon rearward movement.

Shaft 83 extends rearwardly into the housing 89 of the transmission D (Fig. 9) where it is formed with a main driving pinion 90 and a set of external driving clutch teeth (not shown) which are adapted to engage with complementary teeth formed on clutch driving sleeve F whereby a direct drive may be transmitted from shaft 83 to shaft 93 (Fig. 7) in one position, sleeve F being adapted to establish a reduction speed drive between the said shafts when in another position. The transmission shaft 93 carries at its rearward end a propeller shaft brake drum 94 having the braking mechanism generally designated at 95 operably associated therewith. The drive pinion 90 is continuously meshed with one of the gears of a countershaft cluster 97 rotatable on a countershaft 98. The cluster 97 is formed with reduction gear 107 and reverse gear 108, the gear 107 being constantly meshed with the low speed gear 114 journaled on the driven shaft 93 and having a forward extension formed with clutch teeth 115. The reverse gear 108 is adapted to mesh with the reverse idler gear 117 (Figs. 7 and 8) when the latter is slid forwardly on its countershaft 118. At such time, the idler 117 is also meshed with a gear 119 fixed on the driven shaft 93.

The arrangement is such that shaft 93 may be selectively clutched at the will of the driver with gears 114 and 109, the control comprising a manually operable remote shift mechanism suitably connected to a shift sleeve H. The operation of clutch shift sleeve F previously mentioned is, on the other hand, automatic in its operation of clutching driving shaft 83 with gear 109 or disconnecting these parts for reduction gear drive. As previously mentioned, the automatic phase of the transmission will not be described herein, reference being made to our copending application, Serial Number 272,734, for a description thereof.

The manual clutching control comprises the following mechanism. Fixed to the driven shaft 93 is a hub 120 (see Fig. 7) formed with external teeth 121 slidably engaged with the internal teeth 122 of the shiftable clutch sleeve H which is adapted for forward and rearward shift by a yoke 123 fixed to a longitudinally extending shift rail 124 disposed to one side of shaft 93 adjacent the side opening 125 of casing 89.

Suitable synchronizing blocker rings having cammed teeth 128 and 129 which have a pitch circle the same as that of sleeve teeth 122 and teeth 112 and 115 respectively are adapted to block shift of the sleeve H into engagement with the teeth 112 and 115 unless the hub 120 is rotating synchronously therewith. The synchronizing blocker rings are more fully described and claimed in the copending application of O. E. Fishburn, Serial No. 180,840, filed December 20, 1937. The particular type of synchronizing blocker ring used has no bearing on the present invention. Any suitable type that will synchronize the parts to be shifted and block shift of sleeve H until the coacting power transmitting members to be engaged are rotating synchronously may be used.

The yoke 123 is provided with a boss 131 below rail 124 (Figs. 7 and 9) this boss having a slot 132 adapted to be engaged by an inwardly extending pin 133 carried by a lever 134. This lever has a lower end 135 adapted to engage a slot 136 of a yoke 137 fixed to the reverse shift rail 138 which is disposed parallel to and below rail 124. The yoke 137 engages the collar portion 139 of the shiftable reverse idler gear 117 (Fig. 8). Rails 124 and 138 are interlocked by a plunger 140 to prevent their simultaneous displacement.

Lever 134 is supported between its ends by a pin 141 disposed parallel to and above rail 124, this pin being carried by the inner yoked end 142 of shaft 143 rotatably mounted in the boss 144 of a cover 145 secured by fasteners 146 to the opening 125 of casing 89. The shaft 143 has its axis extending across the axis of movement of rails 124 and 138 and has a lever 147 fixed to its inner end outside of the cover 145. A spring 148 reacts on shaft 143 and yieldingly urges lever 134 clockwise (Fig. 7) about the pin 141, thus tending to maintain pin 133 engaged in slot 132 and end 135 free from slot 136. A spring pressed ball detent 149 yieldingly maintains rail 124 in neutral, forwardly (to clutch sleeve H with teeth 112) or rearwardly (to clutch sleeve H with teeth 115) by engagement of this ball detent with the rail recesses 150, 151 and 152, respectively. The reverse rail 138 has neutral and reverse positioning recesses 153 and 154 which are respectively engaged selectively by a second spring pressed ball detent (not shown) in juxtaposed relation to the rail 138.

The upper end of lever 134 has a wide face 156 engageable with the inner end of a plunger 157 slidably inwardly through the cover 145 by a Bowden wire operating mechanism 158. When the wire 158 is pushed, the plunger 157 engages lever face 156 to swing the lever 134 so that the end 135 engages slot 136 while pin 133 disengages slot 132. In such position the shaft 143 may be rotated to shift rail 138 to mesh reverse idler 117 with gears 108 and 119 thereby to establish reverse drive. The plunger 157 maintains a sliding engagement with lever face 156 during this rotation of shaft 143. The remote control mechanism for effecting control of lever 147 and Bowden wire 158 will now be described, reference being had to Figs. 1, 3 and 4 particularly.

The fixed steering post 159 houses the usual steering shaft 160 operated by hand steering wheel 161. Rotatably journalled within post 159 is a hollow shaft assembly 162 connected by pivot pins 163 with the yoked inner end 164 of the manually operable selector element or shift lever 165 which extends outwardly through an arcuate opening 166 formed in the head 167 fixed to post 159. Movement of lever 165 fore and aft about the axis of shaft 162 will oscillate this shaft while movement of the lever up and down will rock the lever about a fulcrum 168 to cause reciprocation of shaft 162 longitudinally of its axis.

At the lower end of shaft 162 there is a lever 169 fixed thereto, this lever having an intermediate wide face portion 170 always engaged by the upper end of a plunger 171 fixed to the upper end of the Bowden wire 158. A spring 172 operates to yieldingly urge plunger 171 into engagement with the lower surface of the portion 170 and plunger 157 positioned as in Fig. 7 free of lever face 156. A link 173 has its forward end pivotally engaged with the outer end of lever 169, the rear end of this link being connected with a bellcrank lever 174 pivotally mounted on the engine A at 175. The bellcrank lever operates a second link 176 which has articulated connection with transmission shift lever 147.

In order to shift sleeve H into engagement with the teeth 115 of low speed drive gear 114, the operator disengages the main clutch by depressing pedal 84 and then swings lever 165 forwardly or counterclockwise from neutral as viewed in Fig. 4. This pushes the lever 147 for rearward swinging movement and serves to shift rail 124 and sleeve H rearwardly. Pedal 84 is then released whereupon the vehicle may be driven forwardly in low range. Shift of lever 165 clockwise will slide rail 124 and sleeve H forwardly to clutch with the teeth 112 of the gear 109 to position the transmission mechanism for drive in high range. In either low range or high range setting of the shift sleeve H, the automatic mechanism of the transmission is operable to shift sleeve F to provide a reduction or direct drive. Thus it may be seen that there are four available forward speeds depending on manipulation of the manually shiftable mechanism and the automatic shift mechanism.

In order to effect reverse drive, the lever 165 is first rocked upwardly while in neutral position to thereby push downwardly through shaft 162 to cause lever portion 170 to operate through the Bowden wire 158 to swing lever 134 counterclockwise about the shaft 141 thereby to engage lever end 135 with slot 136 of yoke 137. Then the lever 165 is shifted clockwise of the steering column to cause lever 147 to rock the lever 134 to effect forward shift of rail 138 thereby to mesh idler 117 with gears 108 and 119. It is understood, of course, that clutch C is preferably released during shift of sleeve H.

While the invention has been described in conjunction with a particular transmission mechanism embodying an automatic phase of operation, it is desired to point out that no substantial changes would have to be made in the manually shiftable mechanism in order to adapt it to the operation of conventional three speeds forward and reverse gear box such as that commonly used in most of our present day automobiles. Therefore, we do not wish to limit our invention in the broader aspects thereof to any particular combination and arrangement of parts such as are shown and described herein for illustrative purposes since various modifications will be apparent from the teachings of our invention and the scope thereof as defined in the claims appended hereto.

We claim:

1. In a motor vehicle power transmission having a pair of selectively operable drive control elements, a pair of rails mounted for shifting movement relative to each other along parallel axes, means operably connecting said rails respectively with said drive control elements, an operating member mounted for oscillatory movement about an axis transverse to said parallel axes to impart shifting movement to said rails, a lever pivotally mounted on said operating member for swinging relative thereto about an axis transverse to said axis of oscillation for selectively operably connecting said operating member with said rails, a remotely disposed shiftable transmission control lever, means for mounting said control lever for shifting movement along transversely connected paths of the same general direction, means including a Bowden cable for imparting swinging movement to said pivotally mounted lever in response to shift of said control lever between said paths, and means including links for oscillating said operating member in response to shift of said control lever along said paths.

2. In a motor vehicle power transmission, in combination, a casing having mounted therein a pair of selectively operable drive control elements, a pair of rails mounted in vertically spaced relation in said casing for shifting movement relative to each other along parallel axes, means operably connecting said rails respectively with said drive control elements, an oscillatory operating member mounted in one side of said casing, a lever pivotally carried by said operating member and adapted to swing relative thereto to selectively operably connect said operating member with said rails, means carried by said operating member for constantly urging said lever into engagement with one of said rails, an actuating element operably associated with said lever but unconnected thereto, and means for operating said actuating element to swing said lever out of engagement with said one rail and into engagement with the other of said rails.

3. In a motor vehicle power transmission, in combination, a casing having mounted therein a pair of selectively operable drive control elements, a pair of rails mounted in vertically spaced relation in said casing for shifting movement relative to each other along parallel axes, means operably connecting said rails respectively with said drive control elements, a detachable cover for said casing adapted for mounting on one side thereof, an oscillatory operating member carried by said cover, a lever pivotally carried by said operating member and adapted to swing relative thereto to selectively operably connect said operating member with said rails, a spring carried by said operating member in engagement with said lever for urging the same into engagement with one of said rails, an actuating element operably associated with said lever but unconnected thereto, and means for operating said actuating element to swing said lever out of engagement with said one rail and into engagement with the other of said rails.

CARL A. NERACHER.
WILLIAM T. DUNN.
TENO IAVELLI.
AUGUSTIN J. SYROVY.
OTTO W. SCHOTZ.